D. M. WINANS.
FASTENER FOR AUTOMOBILE AND VEHICLE CURTAINS.
APPLICATION FILED MAY 2, 1917. RENEWED FEB. 13, 1918.
1,264,242.
Patented Apr. 30, 1918.
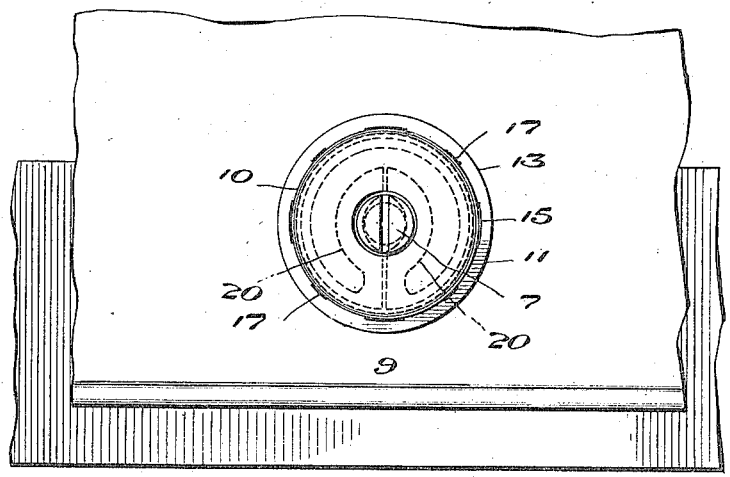
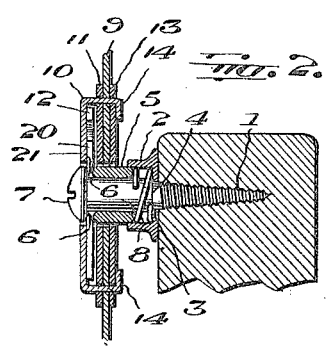
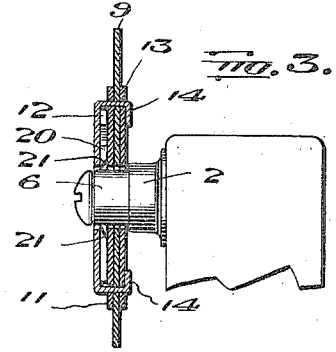
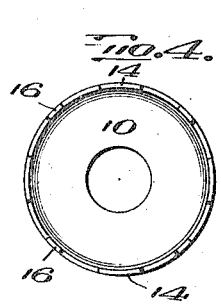
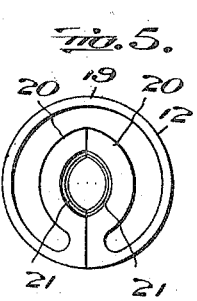
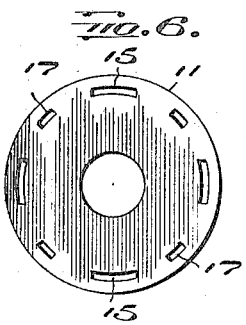
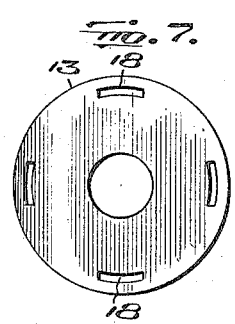
Witness
Philip E. Barnes
Inventor
Daniel M. Winans
by Geo. R. Hamlin
his Atty.

UNITED STATES PATENT OFFICE.

DANIEL M. WINANS, OF BINGHAMTON, NEW YORK, ASSIGNOR TO CRANDAL, STONE & COMPANY, OF BINGHAMTON, NEW YORK, A CORPORATION OF NEW YORK.

FASTENER FOR AUTOMOBILE AND VEHICLE CURTAINS.

1,264,242.     Specification of Letters Patent.     Patented Apr. 30, 1918.

Application filed May 2, 1917, Serial No. 165,991. Renewed February 13, 1918. Serial No. 216,973.

*To all whom it may concern:*

Be it known that I, DANIEL M. WINANS, a citizen of the United States, residing at Binghamton, county of Broome, and State of New York, have invented certain new and useful Improvements in Fasteners for Automobile and Vehicle Curtains, of which the following is a specification.

The object of my present invention is the provision of a simple, neat, and inconspicuous curtain fastener which will comprise a novel stud and a socket of improved construction, the two being adapted for engagement, or disengagement in a rapid and easy manner, but so constructed that they will securely interlock, when snapped together.

The stud is adapted to be screwed or riveted to the body or other part of the vehicle and there is combined therewith a base or cup, a novel slidable sleeve telescoping with the cup, and a spring adapted to hold the sleeve against the head of the stud so that rattling will be prevented.

The socket comprises a shell, a locking spring contained therein adapted to receive the head of the stud and to snap between said head and the sleeve, and a washer or other fastening means.

The spring coöperating with the sleeve on the stud may be dispensed with and modifications may be resorted to without departing from the essential principles of the invention, one embodiment thereof being shown in the accompanying drawings, in which:

Figure 1 is a detail front view showing the fastener in use, the curtain being secured;

Fig. 2 a detail vertical section showing the socket engaged with the stud; Fig. 3 a similar view, the stud being in full lines, and the socket pressed back over the sleeve prior to disconnection of the curtain; and Figs. 4, 5, 6, 7 detail face views of the shell, locking spring, back plate, and securing washer, respectively.

The stud 1 may be in the form of a screw, as shown, or it may be riveted to the body or other part of the vehicle instead of screwed thereto. There is a base or cup 2 having an aperture 3 of a size to permit the shank of the screw to pass therethrough, but sufficiently small so that the cup will bear against the shoulder 4 on the stud. Slidable on the stud 1 is a locking sleeve 5 which has its edges rounded at 6; at least that edge which is adapted to bear on the head 7, being rounded, but as the sleeve is preferably made of round edge ribbon stock, both edges 6 may be rounded. The sleeve 5 is of a diameter adapting it to snugly yet easily telescope within the cup or base 2 and its width is such, in proportion to the depth of the cup 2 and other parts of the device, that said sleeve will not leave the cup. A coil spring 8 which is contained in the cup 2 and surrounds the stud 1, bears against the inner edge of the sleeve 5 and actuates or presses the latter outwardly against the head 7. The spring 8 prevents rattle in the fastener and it is, by preference, employed, but it may be dispensed with without impairing the coöperation of the parts.

A portion of the vehicle curtain is shown at 9. The socket comprises a relatively flat shell 10, a back plate 11, a locking, snap-spring 12 contained within the shell and located between it and the back plate, and a securing washer 13. The shell has prongs 14 passing through slots 15 in the back plate and it is provided with longer clamping prongs 16 passing through slots 17 in the back plate and 18 in the washer to clamp the parts together in a well known manner. The locking spring 12 may be of sheet metal or wire. It is of flat form comprising a resilient or springy part 19 and jaws 20 which are beveled at 21. The space circumscribed by the jaws is smaller than the diameter of the head 7 of the stud. As said head is rounded, the beveled edges 21 enable the jaws to spread apart when the socket is pressed against the stud. Finally the beveled parts 21 engage the rounded edge 6 and, as the socket is pressed still farther onto the stud, the locking sleeve 5 moves into the cup 2 and the jaws snap under the head 7. The spring 8 then holds the locking sleeve 5 against the jaws. The fastener remains securely locked when the parts are in this condition.

To release the fastener, the socket is pressed farther onto the stud, whereupon the beveled edge 21 rides over the rounded edge 6 and onto the sleeve 5, the sleeve then snapping back against the head 7. On pulling the socket outwardly in relation to the stud, the jaws 20 then slip off the sleeve and over the head 7.

Having thus described my invention, what I claim as new and desire to secure by Letters Patent is:—

1. In a fastener for automobile and vehicle curtains, a stud having a head, a sleeve slidable on said stud, and a spring adapted to press said sleeve toward the head of the stud.

2. In a fastener for automobile and vehicle curtains, a stud having a head, a sleeve slidable on said stud, a spring adapted to press said sleeve toward the head of the stud, and a cup or base with which the sleeve telescopes and in which said spring is seated.

3. In a fastener for automobile and vehicle curtains, a stud having a head and provided with a shoulder, a cup or base having an opening, through which said stud passes, said cup being retained by the shoulder aforesaid, a spring seated in the cup, and a sleeve slidable on the stud, said spring pressing said sleeve toward the head of the stud.

4. A fastener for automobile and vehicle curtains comprising a socket having a spring actuated locking jaw, and a headed stud having a spring actuated sleeve adapted to coöperate with the head thereof, said socket having an opening to permit it to be passed over the head of the stud to enable the spring actuated jaw to snap between the sleeve and the head of the stud.

5. A fastener for automobile and vehicle curtains comprising a socket having a shell, provided with an opening, a pair of spring actuated jaws contained within the shell which have beveled edges, a stud having a head, and a spring actuated sleeve on the stud which is adapted to coöperate with the head thereof, the beveled portions on the jaws aforesaid enabling them to spread as they are forced over the head of the stud and then to snap between the end of the sleeve and said head to lock the fastener together, said beveled parts also permitting the jaws to be forced backward over the sleeve to permit detachment of the socket from the stud.

In testimony whereof, I hereunto affix my signature.

DANIEL M. WINANS.

Copies of this patent may be obtained for five cents each, by addressing the "Commissioner of Patents, Washington, D. C."